United States Patent
Wang

(10) Patent No.: US 11,315,238 B2
(45) Date of Patent: Apr. 26, 2022

(54) METHOD FOR MANUFACTURING A PRODUCT

(71) Applicant: Innolux Corporation, Miao-Li County (TW)

(72) Inventor: Tien-Nan Wang, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 244 days.

(21) Appl. No.: 16/711,457

(22) Filed: Dec. 12, 2019

(65) Prior Publication Data

US 2021/0183035 A1 Jun. 17, 2021

(51) Int. Cl.
*G06K 9/00* (2022.01)
*G06T 7/00* (2017.01)

(52) U.S. Cl.
CPC .... *G06T 7/001* (2013.01); *G06T 2207/20081* (2013.01)

(58) Field of Classification Search
CPC ........... G06T 7/001; G06T 2207/20081; G06T 2207/10016; G06T 2207/30164; G06T 2207/20084; G06T 7/0004
See application file for complete search history.

(56) References Cited

U.S. PATENT DOCUMENTS

| | | |
|---|---|---|
| 8,267,632 B2 * | 9/2012 | van der Meulen ........................ H01L 21/67184 414/217 |
| 2007/0282480 A1 * | 12/2007 | Pannese ........... G05B 19/41885 700/213 |
| 2008/0103622 A1 * | 5/2008 | Hanses .............. G05B 19/4183 700/116 |
| 2008/0155450 A1 * | 6/2008 | Pannese ........... H01L 21/67745 715/772 |
| 2008/0189325 A1 * | 8/2008 | Hanses .............. G05B 19/4183 |
| 2008/0219809 A1 * | 9/2008 | van der Meulen ........................ H01L 21/67184 414/217 |
| 2013/0338811 A1 * | 12/2013 | Zhang ................ G05B 19/4184 700/111 |
| 2021/0056681 A1 * | 2/2021 | Hyatt ............... G05B 19/41875 |
| 2021/0233229 A1 * | 7/2021 | Hyatt ................. G01N 21/8851 |

* cited by examiner

*Primary Examiner* — Samir A Ahmed
(74) *Attorney, Agent, or Firm* — JCIPRNET

(57) ABSTRACT

A method for manufacturing a product is provided. The method includes: providing a plurality of components; working on the plurality of components to form the product; and testing the product via a testing method, including: providing first images and second images; assigning the first images by an assigner to a first inspecting unit; determining whether the product corresponding to the first images is OK or not in the first inspecting unit; additionally assigning the second image by the assigner to the first inspecting unit in case no more first image is to be assigned; determining whether the product corresponding to the second image is OK or not in the second inspecting unit or additionally in the first inspecting unit; and sending a message of OK by the assigner for outputting the product that is determined OK.

20 Claims, 6 Drawing Sheets

METHOD FOR MANUFACTURING A PRODUCT

BACKGROUND

Technical Field

The disclosure relates to a method for manufacturing a product.

Description of Related Art

Image detection (or recognition) devices may be deployed in an assembly line. However, in a traditional method, one image detection device is only used to detect one feature. When one image detection device is busy with performing the detection to images to be detected to detect (or determine) whether a specific feature exists in the images to be detected, other image detection devices in the assembly line may become idle if the said other image detection devices do not receive images to be detected. Therefore, the performance of the image detection devices in the assembly line may become low during this situation. In other word, the image detection devices in an traditional assembly line do not achieve the goal of load balance.

SUMMARY

An embodiment of the present disclosure provides a method for manufacturing a product to achieve the load balance in an assembly line.

The disclosure proposes a method for manufacturing a product, comprising: providing a plurality of components; working on the plurality of components to form the product; and testing the product via a testing method, comprising: providing a plurality of first images of the product manufactured; providing a plurality of second images of the product manufactured; assigning the plurality of first images by an assigner to a first inspecting unit; determining whether the product corresponding to the first image is OK or not in the first inspecting unit; assigning the plurality of second images by the assigner to a second inspecting unit; additionally assigning the second image by the assigner to the first inspecting unit in case no more first image is to be assigned; determining whether the product corresponding to the second image is OK or not in the second inspecting unit or additionally in the first inspecting unit; and sending a message of OK by the assigner for outputting the product that is determined OK.

The disclosure proposes a method for manufacturing a product, comprising: providing a plurality of components; working on the plurality of components to form the product; and testing the product, comprising: providing a plurality of first images of the product formed; providing a plurality of second images of the product formed; assigning the plurality of first images by an assigner to a first inspecting unit; determining whether the product corresponding to the plurality of first images is OK or not in the first inspecting unit; assigning at least one of the plurality of second images by the assigner to a second inspecting unit; additionally assigning at least another one of the plurality of second images by the assigner to the first inspecting unit in case no more first image is to be assigned; determining whether the product corresponding to the at least one of the plurality of second images is OK or not in the second inspecting unit or additionally determining whether the product corresponding to the at least another one of the plurality of second images is OK or not in the first inspecting unit; and sending a message of OK by the assigner for outputting the product that is determined OK.

The disclosure proposes a method for manufacturing a product, comprising: providing a plurality of components; working on the plurality of components to form the product; and testing the product, comprising: providing a plurality of first images of the product formed; assigning at least one of the plurality of first images by an assigner to a first inspecting unit; additionally assigning at least another one of the plurality of first images by the assigner to a second inspecting unit when the second inspecting unit is idle; determining whether the product corresponding to the at least one of the plurality of first images is OK or not in the first inspecting unit; and sending a message of OK by the assigner for outputting the product that is determined OK.

Accordingly, the present disclosure provides a method for manufacturing a product, which integrates the scheduling of GPU resources and the distribution of inspection personnel to achieve the load balance in an assembly line.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
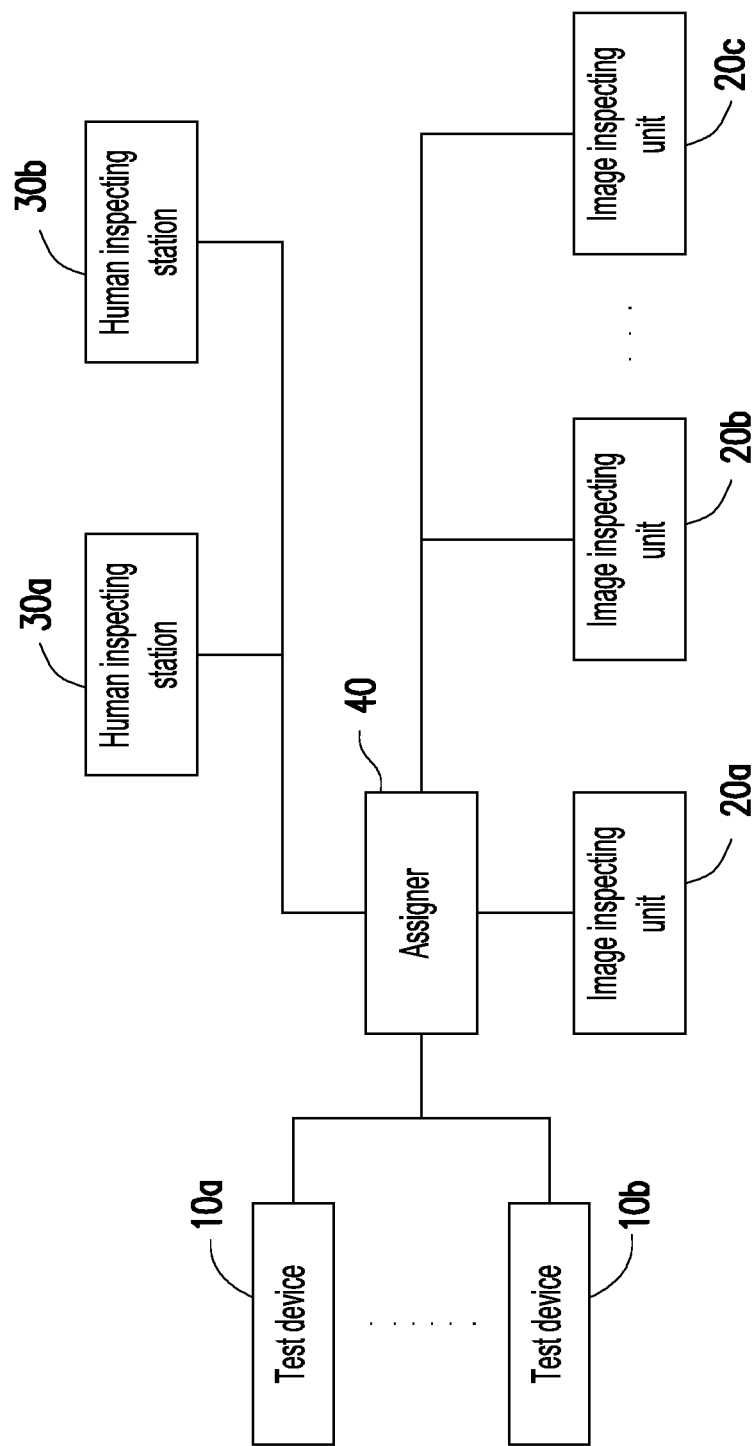
FIG. 1 is a schematic diagram of a product inspecting system in accordance with an embodiment of the present disclosure.

Reference will now be made to exemplary embodiments of the present disclosure in detail, and examples of the exemplary embodiments will be illustrated in the accompanying drawings. In addition, wherever possible, components/members with the same reference numerals are used to represent the same or similar parts in the drawings and the embodiments.

FIG. 1 is a schematic diagram of a product inspecting system in accordance with an embodiment of the present disclosure.

Referring to FIG. 1, a product inspecting system 1000 includes test devices 10a-10b, image inspecting units 20a-20c, human inspecting stations 30a-30b and a assigner 40. There may be wired or wireless transmission within the test devices 10a-10b, the image inspecting units 20a-20c, the human inspecting stations 30a-30b and the assigner 40 via a network. For example, the image inspecting units 20a-20c and the assigner 40 are not limited to electronic devices such as servers. The human inspecting stations 30a-30b are not limited to electronic devices such as mobile phones, tablet computers, notebook computers, and desktop computers. The test devices 10a-10b are not limited to electronic devices including image capturing circuits such as complementary metal oxide semiconductor (CMOS) image sensors, charge coupled device (CCD) image sensors or other similar elements.

Each of the test devices 10a-10b, the image inspecting units 20a-20c, the human inspecting stations 30a-30b and the assigner 40 of the present embodiment includes a processor (not shown), an input circuit (not shown), an output circuit (not shown), a communication circuit (not shown), and a storage circuit (not shown). The foregoing input circuit, output circuit, communication circuit and storage circuit are respectively coupled to the processor.

The processor may be a central processing unit (CPU), a graphics processing unit (GPU), or other programmable general-purpose or special-purpose microprocessors, digital signal processors (DSP), programmable controllers, application specific integrated circuits (ASIC), other similar components, or a combination of the aforementioned components.

The input circuit may receive an input from a user via, for example, a keyboard, a mouse, a touch screen or a microphone.

The output circuit may output a message or a signal via, for example, a screen, a speaker, or other output devices.

The communication circuit may be a component that support a global system for mobile communication (GSM), a personal handy-phone system (PHS), a code division multiple access (CDMA) system, a wideband code division multiple access (WCDMA) system, a long term evolution (LTE) system, a worldwide interoperability for microwave access (WiMAX) system, a wireless fidelity (Wi-Fi) system, Bluetooth, a wireless gigabit alliance (WiGig) technology or other wired signal transmission.

The storage circuit may be any type of fixed or mobile random access memory (RAM), read-only memory (ROM), flash memory or similar components, or a combination of the aforementioned components.

In the present exemplary embodiment, a plurality of program code segments is stored in the storage circuit of each of the test devices 10a-10b, the image inspecting units 20a-20c, the human inspecting stations 30a-30b and the assigner 40. The image inspecting unit 20a is taken as an example, where after the program code segment in the storage circuit of the image inspecting unit 20a is installed, it is executed by the processor of the image inspecting unit 20a. For example, the storage circuit of the image inspecting unit 20a includes a plurality of modules, used to perform various operations of the image inspecting unit 20a in the system 1000 respectively, and each module consists of one or more program code segments. The other components in the system 1000 may be operated in a software-based manner similar to the image inspecting unit 20a, and the descriptions thereof are omitted herein. However, the present disclosure is not limited thereto, and the operation of each of the test devices 10a-10b, the image inspecting units 20a-20c, the human inspecting stations 30a-30b and the assigner 40 may be implemented by using other hardware forms.

It should be noted that in system 1000, only two test devices, three image inspecting units, four human inspecting stations and one assigner are shown in FIG. 1. However, the disclosure is not intended to limit the number of the test devices, the image inspecting units, the human inspecting stations and the assigner.

The disclosure is a centralized architecture system applied in the field of artificial intelligence (AI) by using a deep learning or other machine learning detection technology. AI models (or deep learning models) may be deployed in at least one of the image inspecting units 20a-20c. It should be noted that the deep learning detection technology is implemented by using a model including at least five layers of a neural network. The test devices 10a-10b transmit images or data of manufactured (or formed) product to be inspected to the assigner 40. The assigner 40 then dispatches the images to at least one of the image inspecting units 20a-20c or the human inspecting stations 30a-30b according to task requirements to do further inspection. When the assigner 40 receives the message of test result (or inspecting result) from the image inspecting units 20a-20c or the human inspecting stations 30a-30b, the assigner 40 may report the test result to an information system of the factory. In other words, the system 1000 can flexibly adjust or schedule the use of resources (e.g., the resources of the image inspecting units 20a-20c or human inspecting station 30a-30b) according to the current production conditions in the factory to achieve resource integration and resource conservation. In addition, the configuration of the re-inspection manpower may also be changed from a traditional decentralized configuration to a centralized configuration, but it depends on requirements and is not limited thereto. The assigner 40 can detect workloads of each of the human inspecting stations 30a-30b and assigns jobs to the human inspecting stations 30a-30b according to the detected workloads to achieve the load balance of the human inspecting stations 30a-30b.

It should be noted that the deep learning detection technology often use computers including Graphics Processing Unit (GPU), and the amount of use of a GPU in one computer is extremely high when executing the deep learning detection. In addition, the high accuracy rate of the deep learning detection technology can effectively reduce the personal workload of the inspectors when doing the re-inspect work. Hence, the present disclosure provides a system 1000, which adopts an architecture to integrate the scheduling of GPU resources and the distribution of inspection personnel to achieve the load balance between devices and/or human resources in an assembly line.

In the present embodiment, the image inspecting unit 20a is a rule-based server and the image inspecting units 20b-20c are model-based servers. The rule-based server is a server for executing image processing algorithms which are not the technology of AI, machine learning or deep learning. The rule-based server may inspect an image and determine whether there is any specific feature in the image by using the image processing algorithms. The specific feature may be a flaw or other feature. The following examples are described by assuming that the specific feature is the flaw. If there is no specific feature in the image (i.e., qualified), the rule-based server sends a message of test result indicating "qualified" to the assigner 40. If the image is determined as qualified, the company may continue to the next step/process or ship the product. If there is a specific feature (e.g., flaw) in the image (i.e., unqualified), the rule-based server may send a message of test result indicating "unqualified" to the assigner 40. Thereafter, the rule-based server (or the assigner 40) may send the image with specific feature to at least one of the image inspecting units 20b-20c for further inspecting by using models.

It should be noted that the accuracy of flaw determination using AI models, machine learning models or deep learning models is higher than the accuracy of flaw determination using the image processing algorithm. The model-based servers are servers for executing at least one of AI models, machine learning models and deep learning models. The use of a model is mainly divided into two parts: (1) use a large number of pre-labeled "qualified" or "unqualified" image to train a neural network by using computing resources (e.g., GPU) to generate a trained model; (2) use the trained model to determine whether there is any flaw in an inputted image. The model-based server may inspect an image and determine whether there is any flaw in the image after receiving the images from the rule-based server or the assigner 40. If there is no flaw in the image (i.e., qualified), the model-based server sends a message of test result indicating "qualified" to the assigner 40 (or the rule-based server). If there is a flaw in the image (i.e., unqualified), the modeled-based server may send a message of test result indicating "unqualified" to the assigner 40 (or the rule-based server). Thereafter, the assigner 40 may send the "unqualified" image (which is indicated by at least one of the model-based server) to at least one human inspecting stations 30a-30b to further inspect the image by human.

In other words, the assigner 40 may receive images or data of manufactured (or formed) product from test devices 10a-10b and dispatch the images or data to the corresponding device (i.e., one of the image inspecting units 20a-20c or the human inspecting station 30a-30b) in the system 1000 according to of the type, assembly line or the process of the product. The assigner 40 may receive test results from the image inspecting units 20a-20c or the human inspecting stations 30a-30b and report the test result to an information system of the factory. Also, in the present embodiment, the assigner 40 also dispatch works of training (or establishing) models in image inspecting units 20b-20c.

Figure 2:
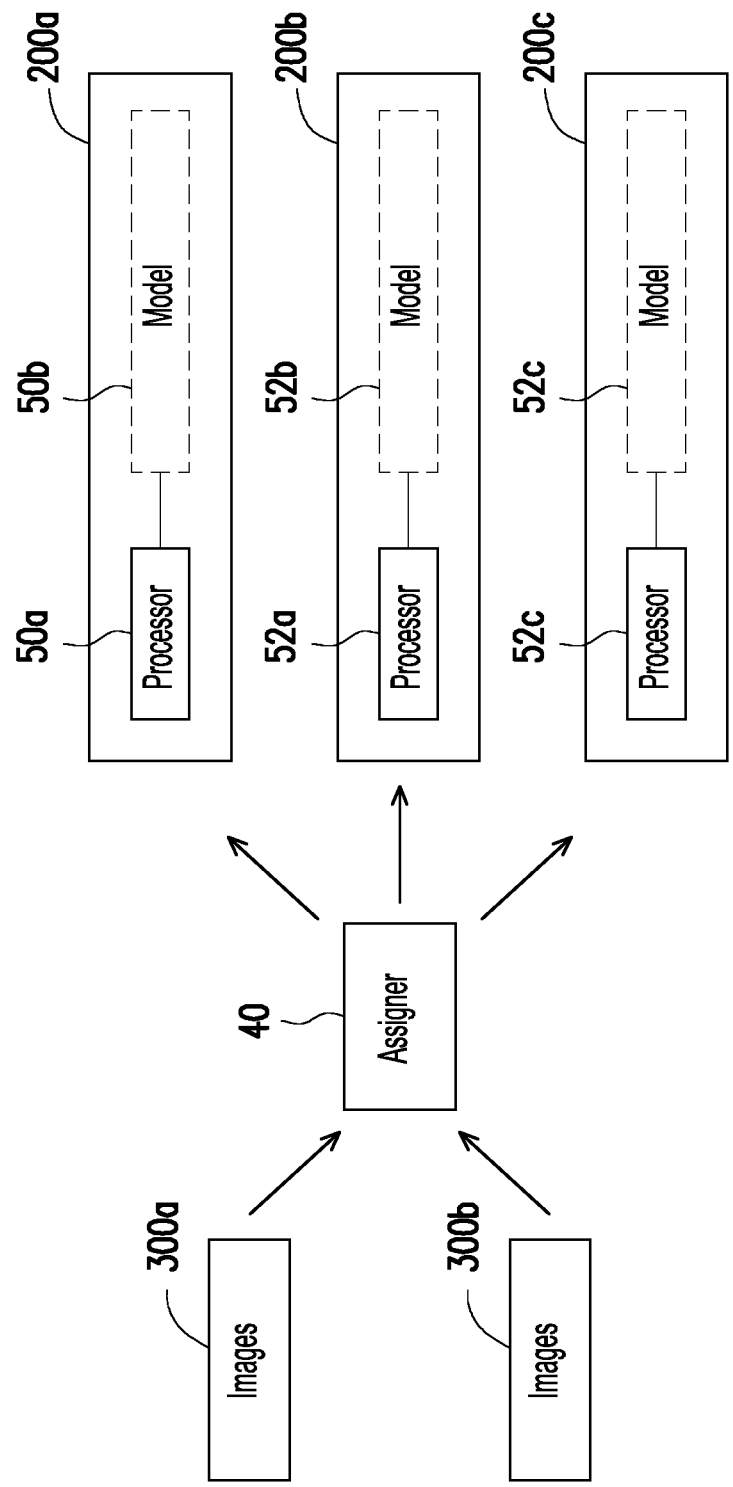
FIG. 2 is a schematic diagram of a product inspecting system performing a testing method in accordance with an embodiment of the present disclosure.
Figure 3:
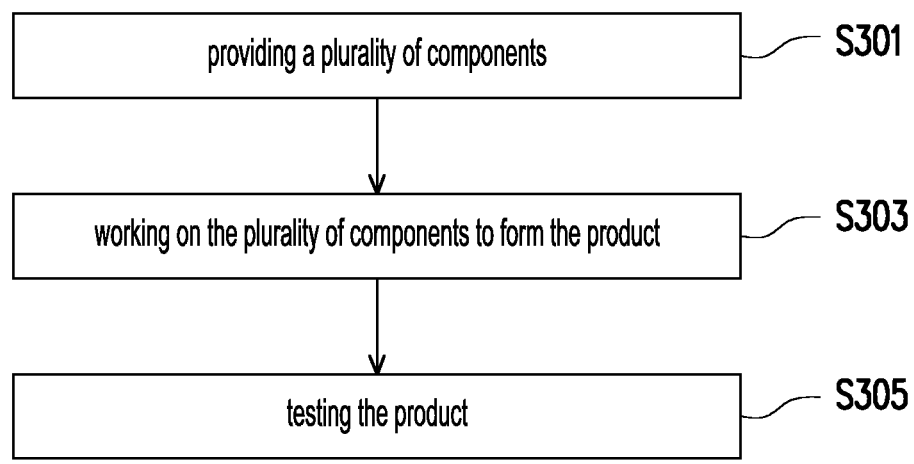
FIG. 3 is a flow chart of a method for manufacturing a product in accordance with an embodiment of the present disclosure.

FIG. 2 is a schematic diagram of a product inspecting system performing a testing method in accordance with an embodiment of the present disclosure. FIG. 3 is a flow chart of a method for manufacturing a product in accordance with an embodiment of the present disclosure.

Referring to FIG. 2 and FIG. 3, it is assumed that the image inspecting units 200a-200c are model-based servers as mentioned above. The image inspecting unit 200a (a.k.a., first inspecting unit) includes a processor 50a for running the model 52a. The image inspecting unit 200b (a.k.a., second inspecting unit) includes a processor 50b for running the model 52b. The image inspecting unit 200c (a.k.a., third inspecting unit) includes a processor 50c for running the model 52c.

In a factory, a factory may provide a plurality of components to manufacture a product (step S301). The factory may work on the components to form the product (step S303). Thereafter, the system in FIG. 1 or FIG. 2 may test the product (step S305).

Figure 4:
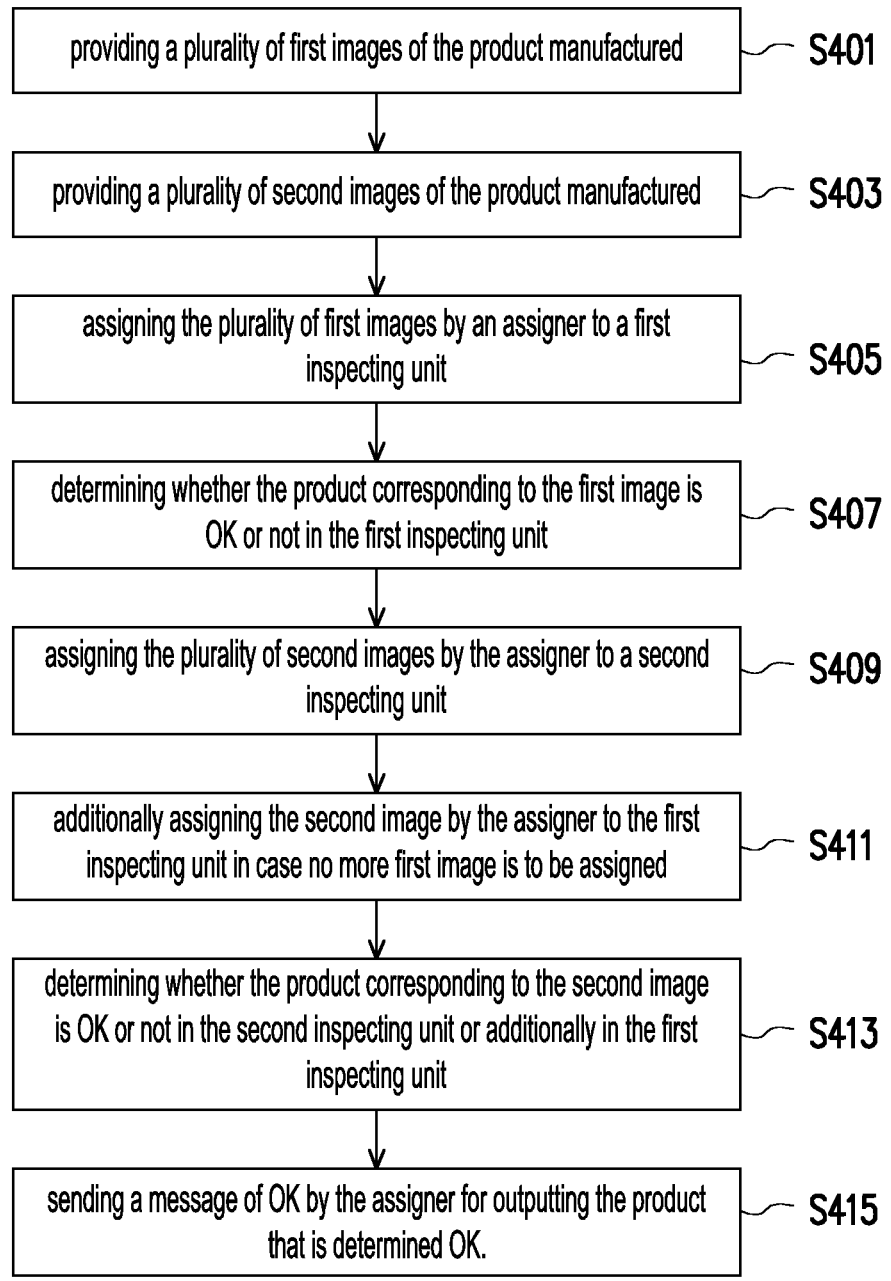
FIG. 4, FIG. 5 and FIG. 6 are flow charts of methods for testing a product in accordance with an embodiment of the present disclosure.
Figure 5:
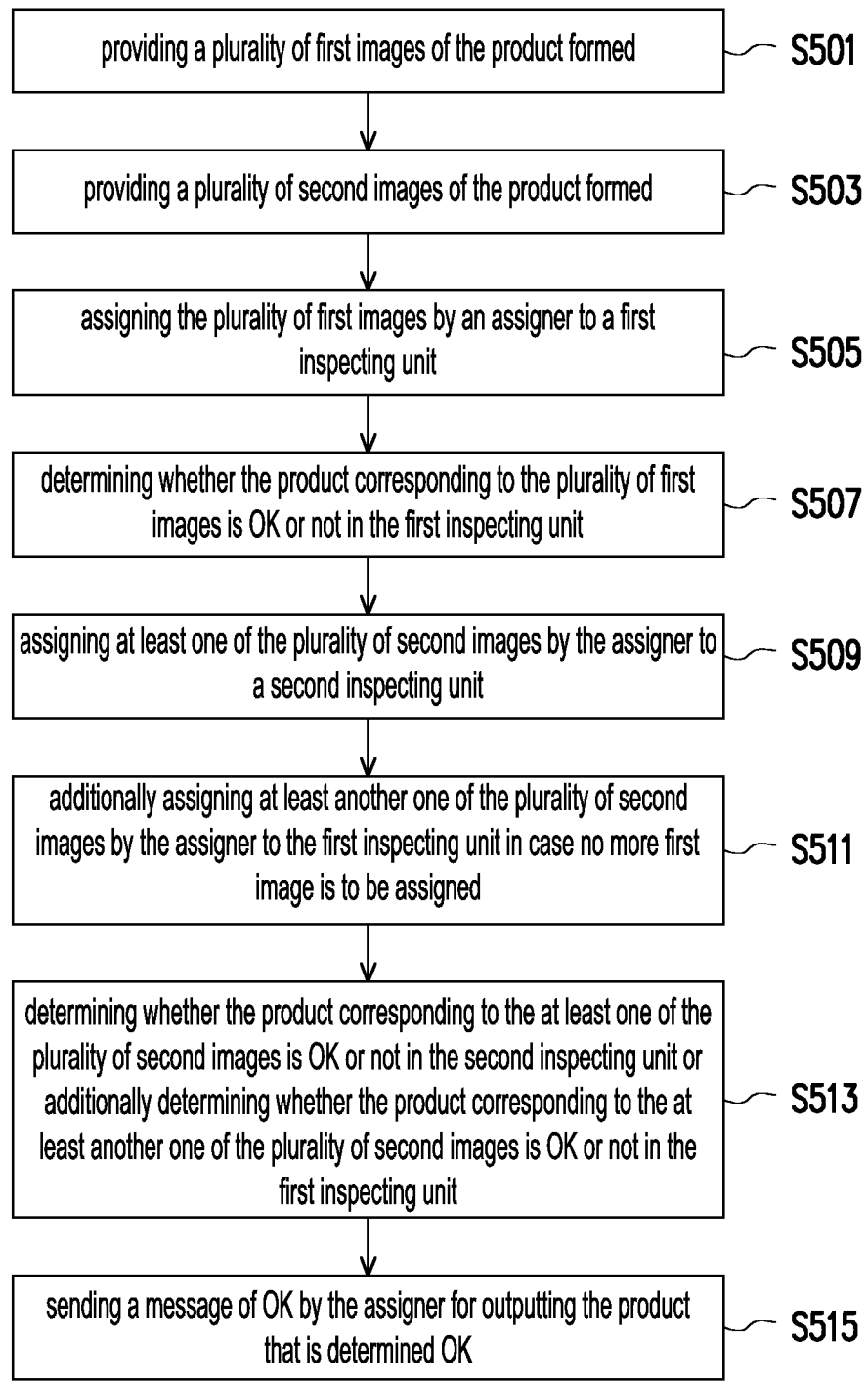
Figure 6:
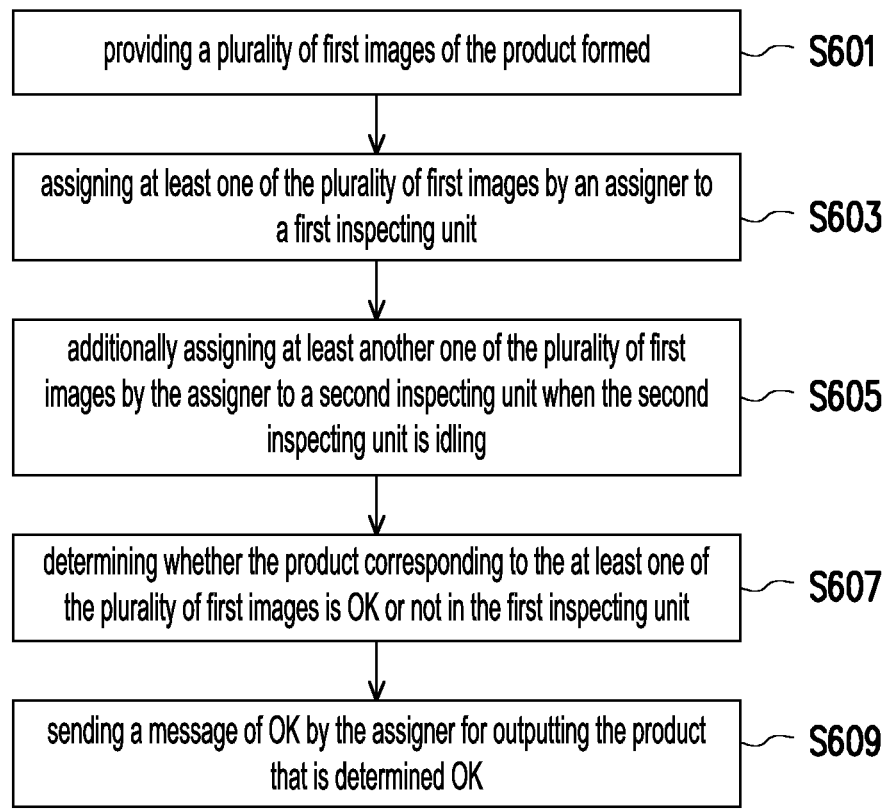

FIG. 4, FIG. 5 and FIG. 6 are flow charts of methods for testing a product in accordance with an embodiment of the present disclosure.

Referring to FIG. 4, in one embodiment, a plurality of images 300a (a.k.a., first images) of the manufactured (or formed) product may be provided by the test device 10a to the assigner 40 (step S401) and a plurality of images 300b (a.k.a., second images) of the manufactured (or formed) product may be provided by the test device 10b to the assigner 40 (step S403). The assigner 40 then assigns (or dispatches) the images 300a to the image inspecting unit 200a (step S402). The image inspecting unit 200a may determine whether the product corresponding to the images 300a are OK (i.e., qualified) or not by using the model 52 (step S407). Also, the assigner 40 may assign part of or all of the images 300b to the image inspecting unit 200b (step S409).

When the image inspecting unit 200a is assigned with images 300a and running the model 52 to inspect the images 300a, it means that the image inspecting unit 200a is busy. In this circumstance, the images 300b is assigned to the idle image inspecting unit 200b. It is assumed that the images 300a are all inspected by the model 52 and no more images 300a are assigned to the image inspecting unit 200a during assigning the images 300b to the image inspecting unit 200b, it means that the image inspecting unit 200a is idle. At this time, the assigner 40 may assign the remaining part of the images 300b, which are not assigned to the image inspecting unit 200b yet, to the image inspecting unit 200a (step S411). Thereafter, the image inspecting unit 200a and image inspecting unit 200b may determine whether the product corresponding to the image 300b is OK (i.e., qualified) or not (step S413). The image inspecting unit 200a and image inspecting unit 200b may send a message of OK to the assigner 40 and the assigner 40 may output a message (indicating that the product is OK) to an information system of the factory (step S415). Thereafter, the company may proceed the product corresponding to the qualified image to the next step or the product shipment.

It should be noted that, in the embodiment of FIG. 2, the product is determined OK or not in the image inspecting unit 200a and the image inspecting unit 200b by inspecting the images 300a and the images 300b of the product through models 52a-52b. Models 52a-52b may be the same inspecting model or different inspecting models. In an embodiment, models 52a-52b are deep learning models. In an embodiment, both models 52a-52b are implemented by using the same AI models. In an embodiment, one of the models 52a-52b is implemented by using an AI model and the other one of the models 52a-52b is implemented by using a deep learning model.

After determining by using the models 52a-52b, the image inspecting unit 200a and the image inspecting unit 200b may send test result to the assigner 40. The assigner 40 may assign image with flaw, assuming which is one of the images 300a which is not determined OK, to one of the human inspecting stations 30a-30b. Thereafter, a worker of the factory may operate the human inspecting station which receives the image transmitted by the assigner 40 to determine whether the product corresponding to the image 300a is OK or not. If the worker determines that the product corresponding to the image 300a is OK, the worker may operate the human inspecting station to send a message of OK to the assigner 40 and the assigner 40 may output a message indicating that the product is determined OK. If the worker determines that the product corresponding to the image 300a is not OK, the worker may repair the product corresponding to the image 300a that is not determined OK.

Referring to FIG. 5, in another embodiment, after a plurality of images 300a (a.k.a., first images) of the manufactured (or formed) product are provided by the test device 10a to the assigner 40 (step S501) and a plurality of images 300b (a.k.a., second images) of the manufactured (or formed) product are provided by the test device 10b to the assigner 40 (step S503), the assigner 40 then assigns (or dispatches) the images 300a to the image inspecting unit 200a (step S505). The image inspecting unit 200a may determine whether the product corresponding to the images 300a are OK (i.e., qualified) or not by using the model 52 in the image inspecting unit 200a (step S507). Also, the assigner 40 may assign at least one of the images 300b to the image inspecting unit 200b (step S509). Similar to the previous embodiment, the assigner 40 may additionally assign at least another one of images 300b to the image inspecting unit 200a in case no more images 300a are to be assigned to the image inspecting unit 200a (step S511). It should be noted that when the image inspecting unit 200a is not idle, the assigner 40 may not additionally assign at least another one of images 300b to the image inspecting unit 200a. It is determined whether the product corresponding to the at least one of the images 300b is OK or not by the image inspecting unit 200b or additionally determining whether the product corresponding to the at least another one of the images 300b is OK or not in the image inspecting unit 200a (step S513). Thereafter, the image inspecting unit 200a or the image inspecting unit 200b may send test result to the assigner. The assigner may send a message of OK to an information system of the factory for outputting the product that is determined OK (step S515).

Referring to FIG. 6, in another embodiment, after a plurality of images 300a (a.k.a., first images) of the manufactured (or formed) product are provided by the test device 10a to the assigner 40 (step S601), the assigner 40 then assigns (or dispatches) at least one of the images 300a to the image inspecting unit 200a (step S603). The assigner 40 additionally assigns (or dispatches) at least another one of the images 300a to the image inspecting unit 200b when the image inspecting unit 200b is idle (step S605). It should be noted that when the image inspecting unit 200b is not idle, the assigner 40 may not additionally assign at least another one of images 300a to the image inspecting unit 200b. The image inspecting unit 200a may determine whether the product corresponding to the at least one of the images 300a are OK (i.e., qualified) or not by using the model 52a in the image inspecting unit 200a (step S607). Also, the image inspecting unit 200b may determine whether the product corresponding to the at least another one of the images 300a are OK (i.e., qualified) or not by using the model 52b in the image inspecting unit 200b. Thereafter, the image inspecting unit 200a and/or the image inspecting unit 200b may send test result to the assigner 40. The assigner 40 may send a message of OK to an information system of the factory for outputting the product that is determined OK (step S609).

It should be noted that processors 50a-50c can inspect images 300a and images 300b, and can also inspect various features (such as first feature and second feature). There are different kinds of features (e.g., flaw and other features) in one image can be inspected, if the model 52a is for inspecting the first feature and the model 52b is for inspecting the second feature, one image may be assigned to both image inspecting units 200a-200b for inspecting first feature and second feature in the image. In an embodiment, one model may inspect various features such that one model may inspect part of or all of the features in an image. In an embodiment, the assigner 40 can only assign part of the images 300a to the image inspecting units 200a, and assign another part of the images 300a to the image inspecting units 200b or 200c. Each image inspecting units 200a-200c may only inspect one feature or all features in the same step (or within the same model). In an embodiment, the assigner 40 can assign all of the images 300b to the image inspecting units 200b for inspecting one or all of the features in the images 300b. In an embodiment, the assigner 40 can only assign part of the images 300b to the image inspecting units 200b, and assign another part of the images 300a to the image inspecting units 200a or 200c. Each image inspecting units 200a-200c may only inspect one feature or all features at the same time.

Accordingly, the present disclosure provides a method for manufacturing a product, which integrates the scheduling of GPU resources and the distribution of inspection personnel to achieve the load balance in an assembly line.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for manufacturing a product, comprising:
providing a plurality of components;
working on the plurality of components to form the product; and
testing the product via a testing method under management of an assigning processor, and the testing method comprising:
providing a plurality of first images of the product manufactured to the assigning processor;
providing a plurality of second images of the product manufactured to the assigning processor;
assigning the plurality of first images by the assigning processor to a first inspecting device;
determining whether the product corresponding to the plurality of first images is OK or not in the first inspecting device;
assigning a first part of the plurality of second images by the assigning processor to a second inspecting device;
using the assigning processor to perform a load balance between the first inspecting device and the second inspecting device by additionally assigning a second part of the plurality of second images to the first inspecting device in case no more first image included in the plurality of first images is to be assigned;
determining whether the product corresponding to the first part of the plurality of second images is OK or not in the second inspecting device, or additionally determining whether the product corresponding to the second part of the plurality of second images is OK or not in the first inspecting device; and
sending a message of OK by the assigning processor for outputting the product that is determined OK.

2. The method of claim 1, wherein the product is determined OK or not in the first inspecting device and the second inspecting device by inspecting the plurality of first and second images of the product through at least one inspecting model.

3. The method of claim 2, wherein the product is determined OK or not by inspecting the plurality of first and second images of the product through the same inspecting model.

4. The method of claim 2, wherein the product is determined OK or not by inspecting the plurality of first and second images of the product through different inspecting models.

5. The method of claim 2, wherein the at least one inspecting model is a deep learning model.

6. The method of claim 1, wherein the testing method further comprises:
assigning a first image included in the plurality of first images of the product to human by the assigning processor if the product corresponding to the first image that is not determined OK;
determining whether the product corresponding to the first image is OK or not by the human; and sending a message of OK by the assigning processor for outputting the product that is determined OK by the human.

7. The method of claim 6, further comprising repairing the product corresponding to the first image that is not determined OK by the human.

8. A method for manufacturing a product, comprising:
providing a plurality of components;
working on the plurality of components to form the product; and
testing the product via a testing method under management of an assigning processor, and the testing method comprising:
providing a plurality of first images of the product formed to the assigning processor;
providing a plurality of second images of the product formed to the assigning processor;
assigning the plurality of first images by the assigning processor to a first inspecting device;
determining whether the product corresponding to the plurality of first images is OK or not in the first inspecting device;
assigning at least one of the plurality of second images by the assigning processor to a second inspecting device;
using the assigning processor to perform a load balance between the first inspecting device and the second inspecting device by additionally assigning at least another one of the plurality of second images to the first inspecting device in case no more first image included in the plurality of first images is to be assigned;
determining whether the product corresponding to the at least one of the plurality of second images is OK or not in the second inspecting device, or additionally determining whether the product corresponding to the at least another one of the plurality of second images is OK or not in the first inspecting device; and
sending a message of OK by the assigning processor for outputting the product that is determined OK.

9. The method of claim 8, wherein the product is determined OK or not in the first inspecting device and the second inspecting device by inspecting the plurality of first and second images of the product through at least one inspecting model.

10. The method of claim 9, wherein the product is determined OK or not by inspecting the plurality of first and second images of the product through the same inspecting model.

11. The method of claim 9, wherein the product is determined OK or not by inspecting the plurality of first and second images of the product through different inspecting models.

12. The method of claim 9, wherein the at least one inspecting model is a deep learning model.

13. The method of claim 8, wherein the testing method further comprises:
assigning a first image included in the plurality of first images of the product to human by the assigning processor if the product corresponding to the first image that is not determined OK;
determining whether the product corresponding to the first image is OK or not by the human; and
sending a message of OK by the assigning processor for outputting the product that is determined OK by the human.

14. The method of claim 13, further comprising repairing the product corresponding to the first image that is not determined OK by the human.

15. A method for manufacturing a product, comprising:
providing a plurality of components;
working on the plurality of components to form the product; and
testing the product via a testing method under management of an assigning processor, and the testing method comprising:
providing a plurality of first images of the product formed to the assigning processor;
assigning at least one of the plurality of first images by the assigning processor to a first inspecting device;
using the assigning processor to perform a load balance between the first inspecting device and a second inspecting device by additionally assigning at least another one of the plurality of first images to the second inspecting device when the second inspecting device is idle;
determining whether the product corresponding to the at least one of the plurality of first images is OK or not in the first inspecting device; and
sending a message of OK by the assigning processor for outputting the product that is determined OK.

16. The method of claim 15, further comprising:
determining whether the product corresponding to the at least another one of the plurality of first images is OK or not in the second inspecting device.

17. The method of claim 16, wherein the product is determined OK or not in the first inspecting device and the second inspecting device by inspecting the plurality of first images of the product through at least one inspecting model.

18. The method of claim 17, wherein the product is determined OK or not by inspecting the plurality of first images of the product through the same inspecting model.

19. The method of claim 17, wherein the product is determined OK or not by inspecting the plurality of first images of the product through different inspecting models.

20. The method of claim 15, wherein the testing method further comprises:
assigning a first image included in the plurality of first images of the product to human by the assigning processor if the product corresponding to the first image that is not determined OK;
determining whether the product corresponding to the first image is OK or not by the human; and
sending a message of OK by the assigning processor for outputting the product that is determined OK by the human.

* * * * *